(12) United States Patent
Cheng et al.

(10) Patent No.: US 10,665,863 B2
(45) Date of Patent: May 26, 2020

(54) ADDITIVES FOR FAST CHARGEABLE LITHIUM ION BATTERIES

(71) Applicant: NEC CORPORATION, Tokyo (JP)

(72) Inventors: Qian Cheng, Tokyo (JP); Noriyuki Tamura, Tokyo (JP)

(73) Assignee: NEC CORPORATION, Minato-ku, Tokyo (JP)

(*) Notice: Subject to any disclaimer, the term of this patent is extended or adjusted under 35 U.S.C. 154(b) by 78 days.

(21) Appl. No.: 15/753,781

(22) PCT Filed: Aug. 21, 2015

(86) PCT No.: PCT/JP2015/004198
§ 371 (c)(1),
(2) Date: Feb. 20, 2018

(87) PCT Pub. No.: WO2017/033213
PCT Pub. Date: Mar. 2, 2017

(65) Prior Publication Data
US 2018/0248194 A1 Aug. 30, 2018

(51) Int. Cl.
| | | |
|---|---|---|
| H01M 10/0525 | (2010.01) | |
| H01M 4/62 | (2006.01) | |
| H01M 4/587 | (2010.01) | |
| C01B 32/192 | (2017.01) | |
| C01B 32/184 | (2017.01) | |
| H01M 10/052 | (2010.01) | |

(52) U.S. Cl.
CPC ........... *H01M 4/625* (2013.01); *C01B 32/184* (2017.08); *C01B 32/192* (2017.08); *H01M 4/587* (2013.01); *H01M 10/0525* (2013.01); *C01B 2204/02* (2013.01); *C01B 2204/04* (2013.01); *C01B 2204/22* (2013.01); *C01P 2006/10* (2013.01); *C01P 2006/14* (2013.01); *C01P 2006/16* (2013.01); *H01M 10/052* (2013.01); *H01M 2220/20* (2013.01); *Y02E 60/122* (2013.01); *Y02T 10/7011* (2013.01)

(58) Field of Classification Search
CPC .... H01M 4/62; H01M 10/0525; H01M 4/587; H01M 4/625; C01B 32/184; C01B 32/192
See application file for complete search history.

(56) References Cited

U.S. PATENT DOCUMENTS

| | | | | |
|---|---|---|---|---|
| 8,691,441 | B2* | 4/2014 | Zhamu | H01M 4/13 |
| | | | | 252/502 |
| 9,592,475 | B2* | 3/2017 | Stoltenberg | B01D 69/02 |
| 2012/0269716 | A1* | 10/2012 | Oh | B82Y 30/00 |
| | | | | 423/448 |
| 2016/0284481 | A1* | 9/2016 | Duan | H01G 11/36 |

FOREIGN PATENT DOCUMENTS

| | | | |
|---|---|---|---|
| CN | 103682368 | * | 3/2014 |
| CN | 103682368 A | | 3/2014 |
| WO | 2012/048194 A2 | | 4/2012 |
| WO | 2012/075960 A1 | | 6/2012 |
| WO | 2013/181994 A1 | | 12/2013 |
| WO | WO 2013/181994 | * | 12/2013 |
| WO | 2015/088451 A1 | | 6/2015 |

OTHER PUBLICATIONS

Dengyu Pan et al., "Li Storage Properties of Disordered Graphene Nanosheets", Chemistry of Materials, 2009, pp. 3136-3142, vol. 21, No. 14.
D. H. Wang et al., "Holey reduced graphene oxide nanosheets for high performance room temperature gas sensing", Journal of Materials Chemistry A, Materials for Energy and Sustainability, Nov. 7, 2014, pp. 17415-17420, vol. 2, No. 41.
Written Opinion for PCT/JP2015/004198, dated Oct. 27, 2015.
International Search Report for PCT/JP2015/004198, dated Oct. 27, 2015.

* cited by examiner

*Primary Examiner* — Alexander Usyatinsky
(74) *Attorney, Agent, or Firm* — Sughrue Mion, PLLC

(57) ABSTRACT

A porous graphene material with 1 to 200 graphene layers, wherein: at least one monolayer graphene is included; pores with the size of 70 nm to 200 nm are scattered over the surface of the material and the number of pores is 10 to 500 per $\mu m^2$; an oxygen concentration is below 0.8 atomic %; and the ratio of the peak height ($I_D$) of D band in a Raman scattering spectrum of the material to that of the peak height ($I_G$) of G band at 1,570 to 1,596 $cm^{-1}$ in the spectrum ($I_D/I_G$) is between 1 and 1.35. The porous graphene material is suitable for conductive additives for electrodes of Lithium ion battery.

18 Claims, 9 Drawing Sheets

[Fig. 1 (A)]
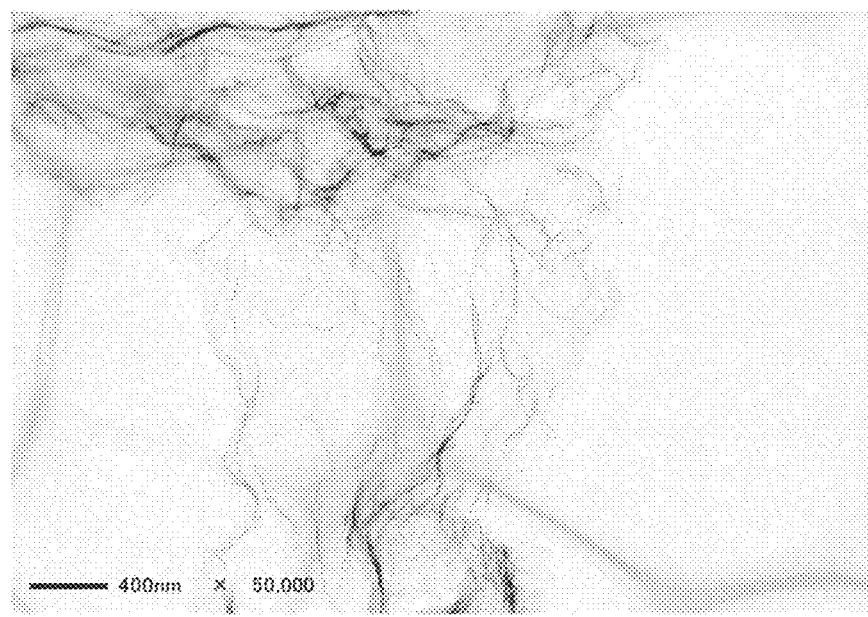
[Fig. 1 (B)]
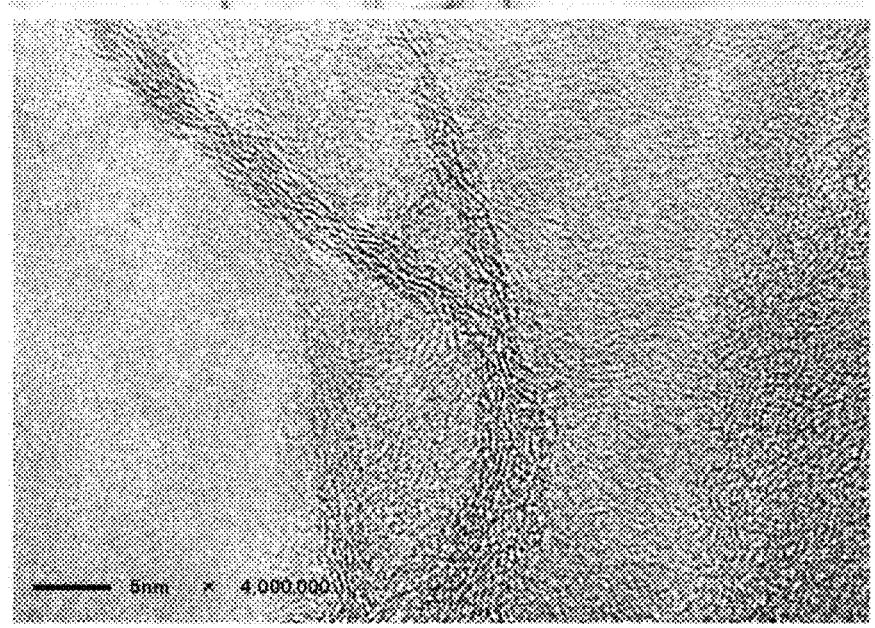

[Fig. 2 (A)]
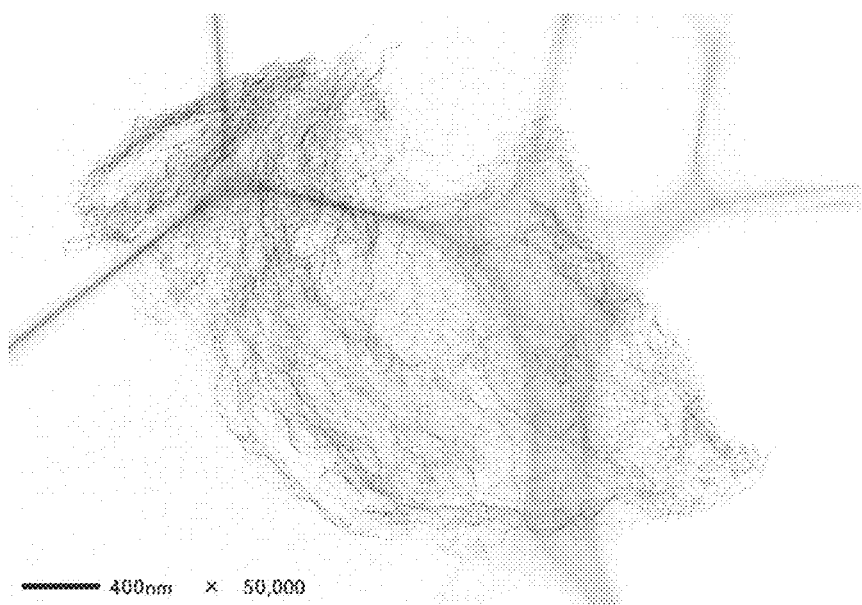
[Fig. 2 (B)]
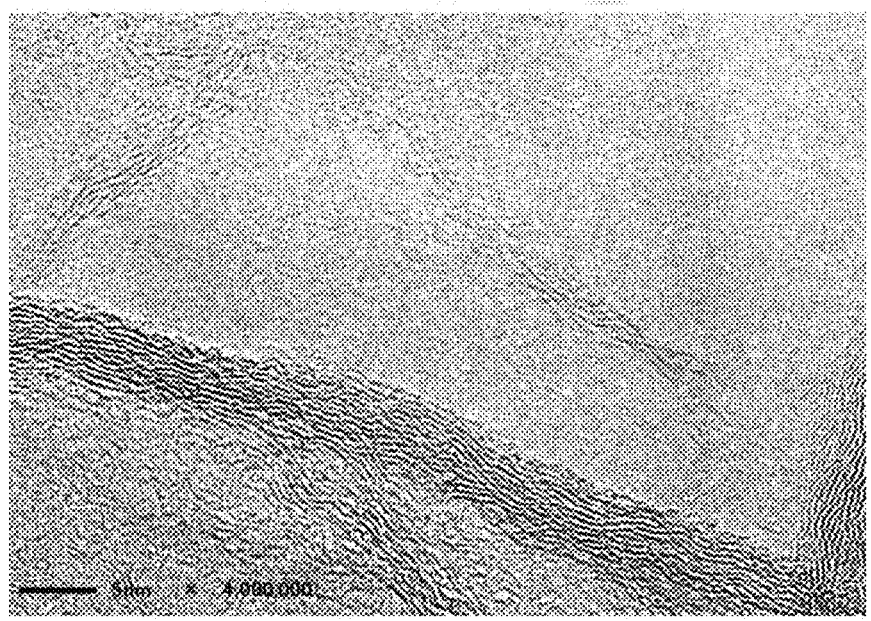

[Fig. 3]
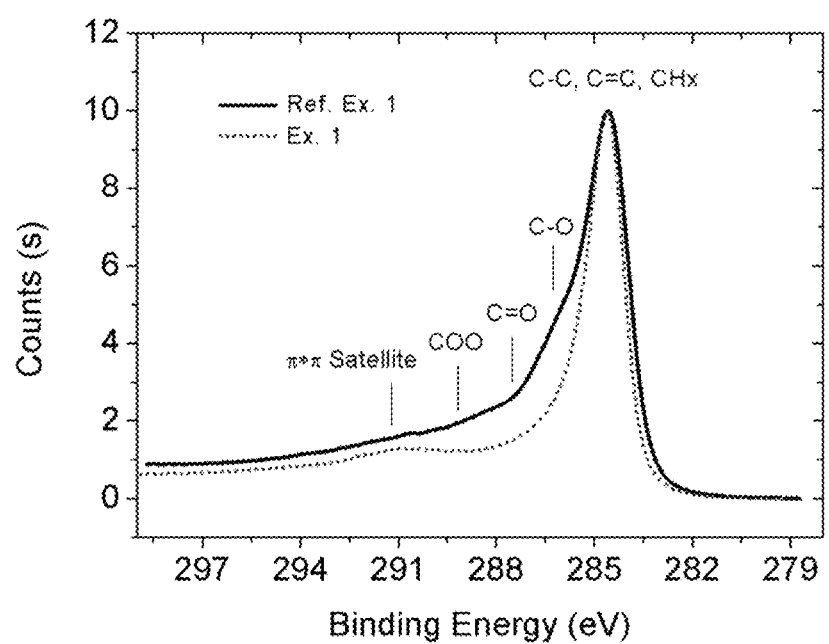

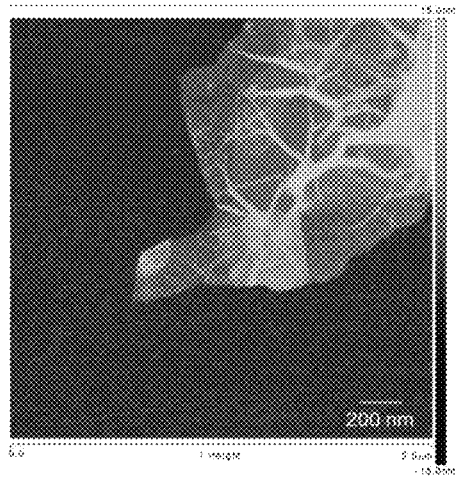
[Fig. 4 (A)]
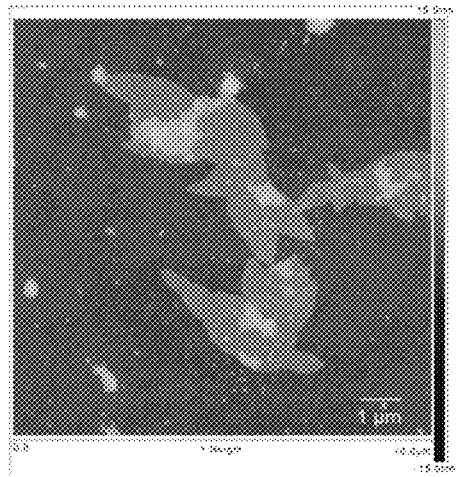
[Fig. 4 (B)]
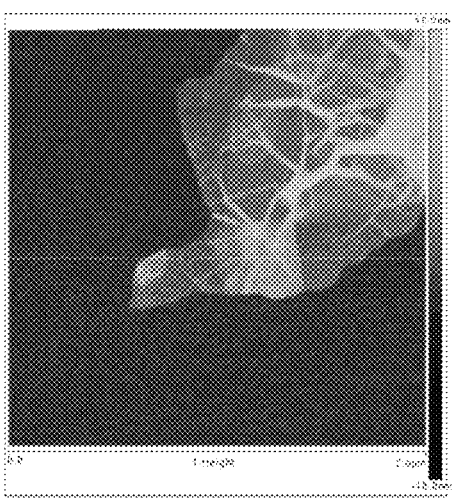
[Fig. 4 (C)]

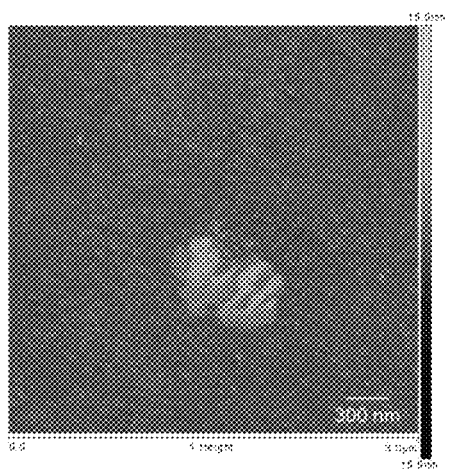
[Fig. 5 (A)]
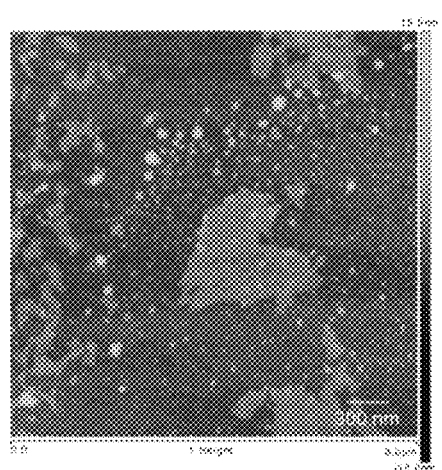
[Fig. 5 (B)]
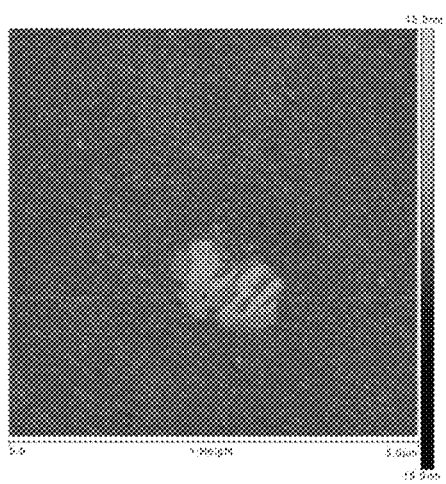
[Fig. 5 (C)]

[Fig. 6]
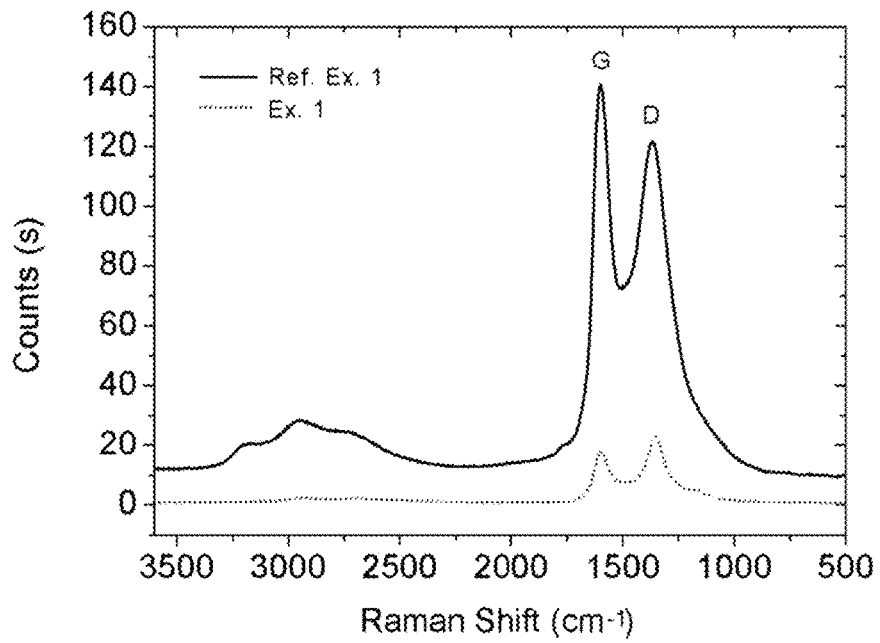
[Fig. 7]
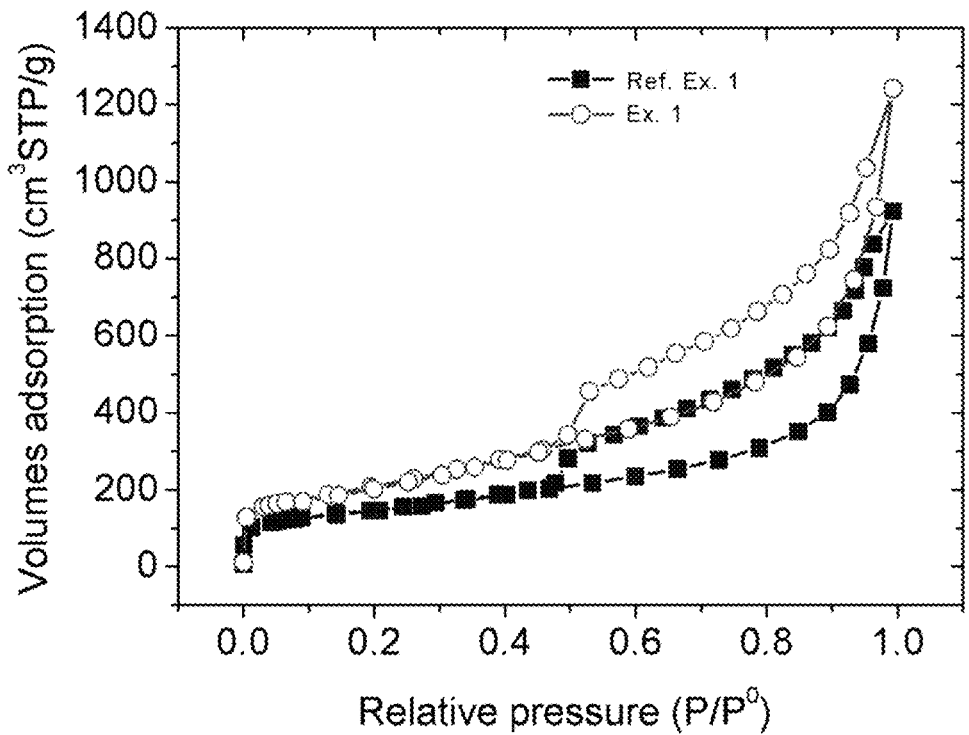

[Fig. 8]
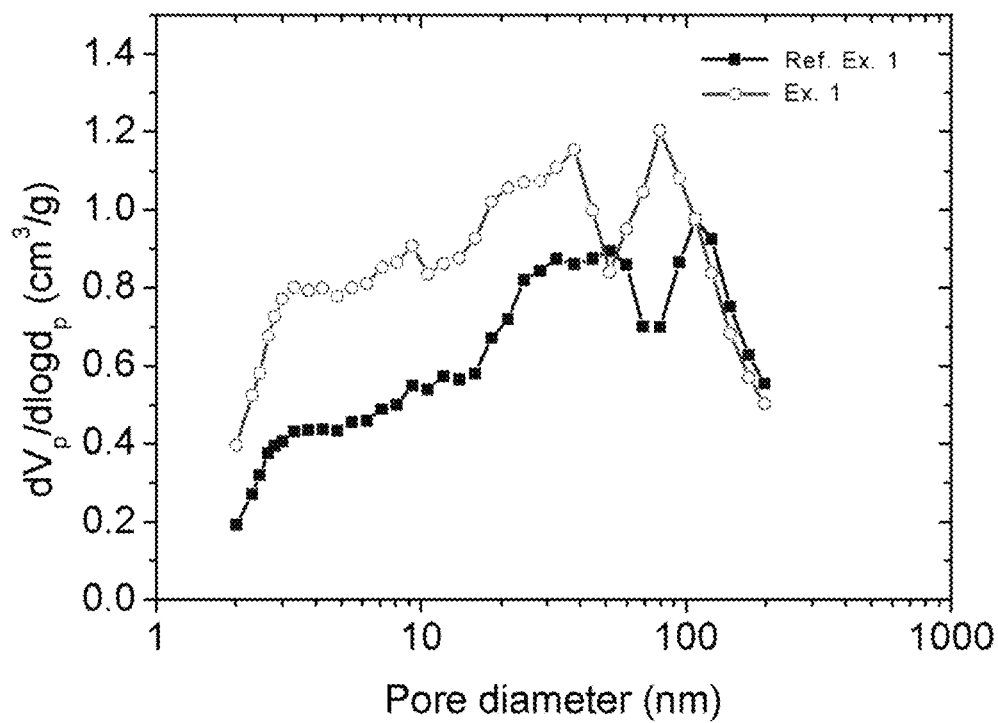
[Fig. 9]
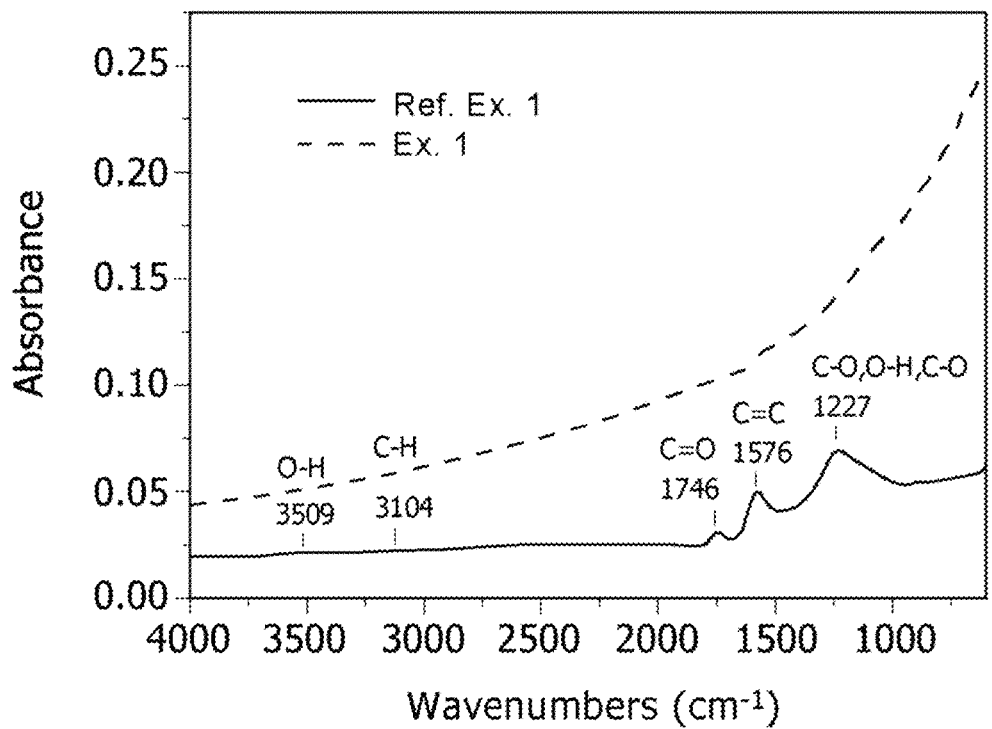

[Fig. 10]
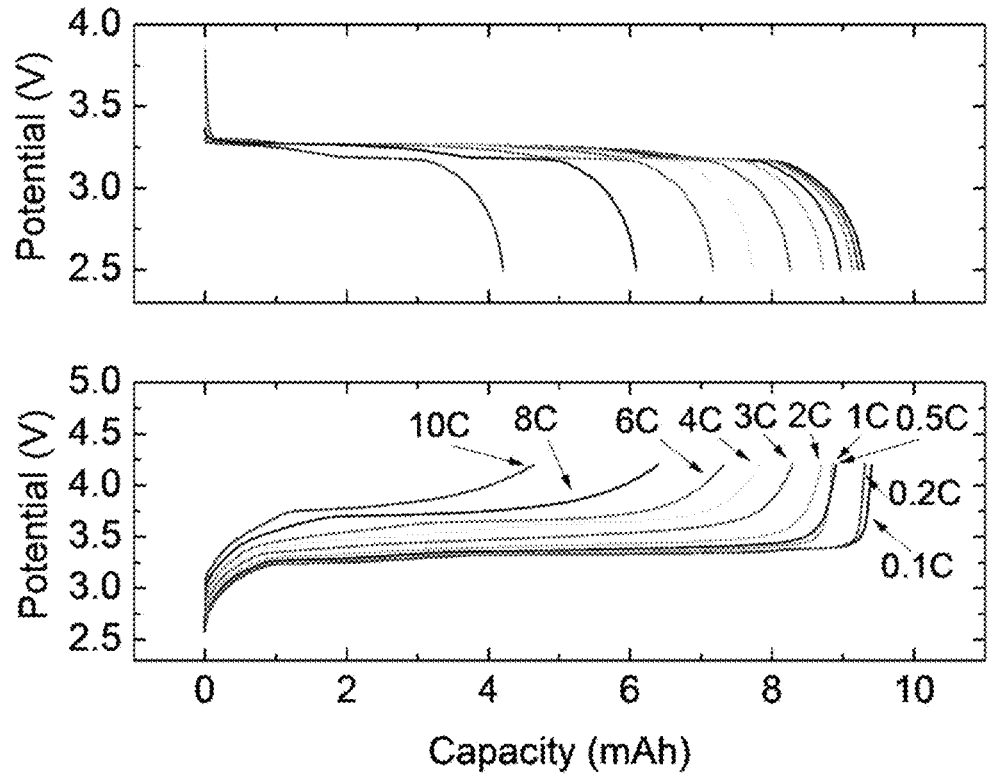
[Fig. 11]
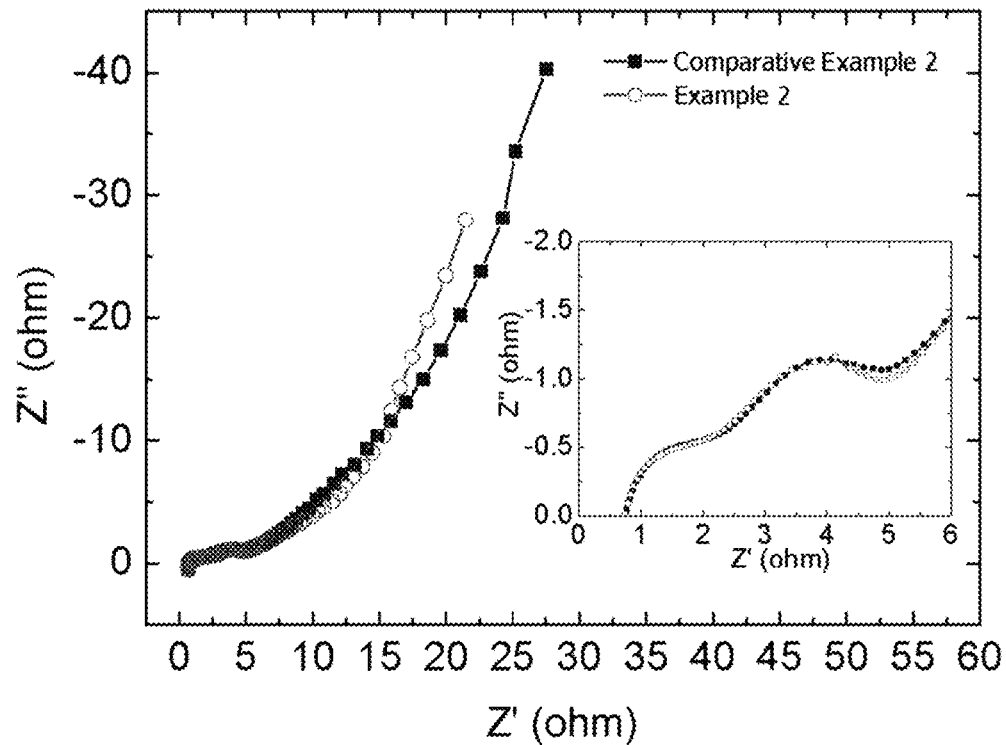

[Fig. 12]
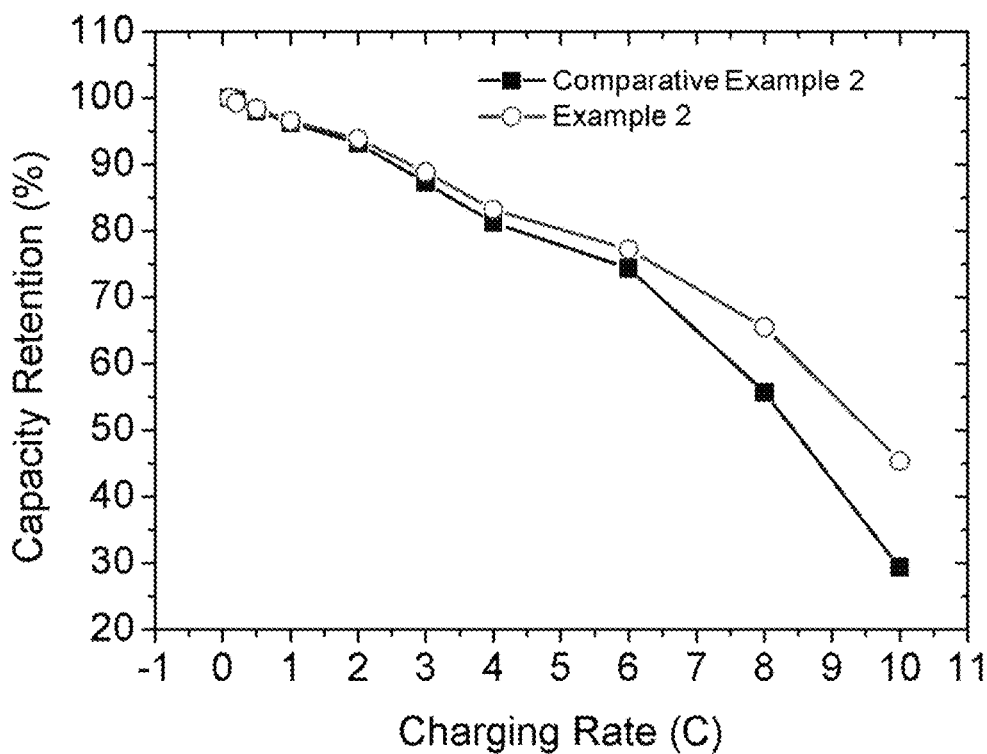
[Fig. 13]
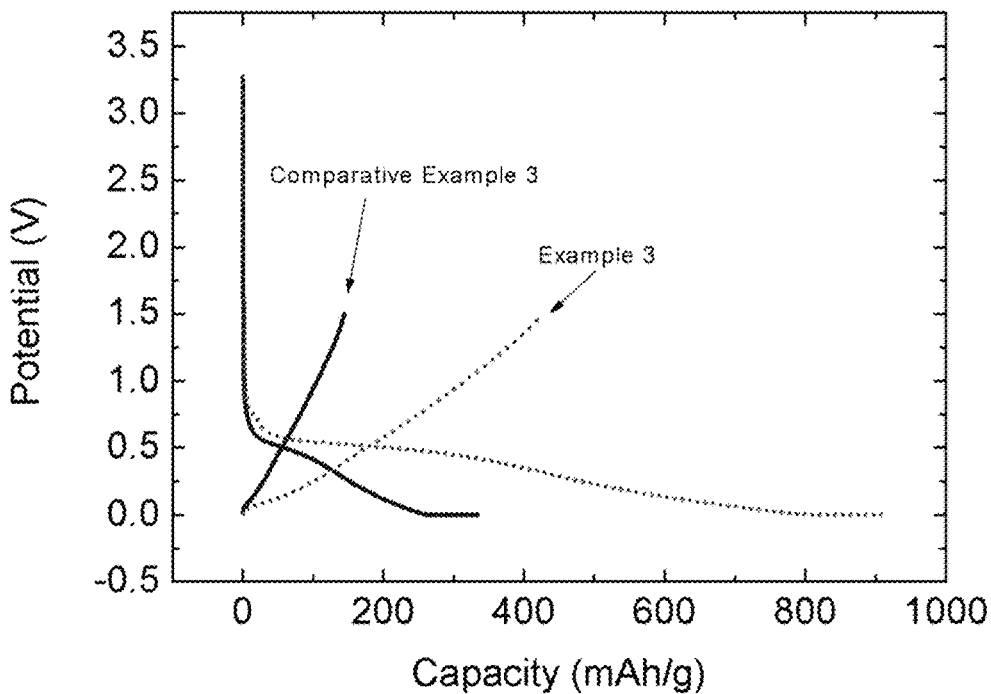

ADDITIVES FOR FAST CHARGEABLE LITHIUM ION BATTERIES

CROSS REFERENCE TO RELATED APPLICATIONS

This application is a National Stage of International Application No. PCT/JP2015/004198 filed Aug. 21, 2015.

TECHNICAL FIELD

The present invention relates to an activated porous graphene material can be used as an additive and active material coating for lithium ion batteries.

BACKGROUND ART

Lithium-ion (Li-ion) batteries have been widely used for portable electronics, and they are being intensively pursued for hybrid vehicles (HVs), plug-in hybrid vehicles (PHVs), electric vehicles (EVs), and stationary power source applications for smarter energy management systems. The greatest challenges in adopting the technology for large-scale applications are the energy density, power density, cost, safety, and cycle life of current electrode materials. Of all the properties, the charging time is the most important characteristics for the battery as well as the power density, especially as the application targets of Li-ion batteries move from small mobile devices to transportation. This is because EV users, for example, are hardly to wait more than half an hour to charge their vehicles during a long drive compared with a refueling period of less than 5 min for gasoline cars. The power performance of lithium ion battery is greatly affected by the conductivity of both anode and cathode materials, which rely on conductive additives.

Carbon based conductive additives such as carbon black and acetylene black are the commercially available. However, a uniform distribution of these carbon based conductive additives in a binder is always suppressed due to aggregation of the additives; as a result, the charging speed is hardly improved. Other kinds of carbon materials such as carbon nanotubes (CNTs) and carbon fibers also have difficulty to improve the kinetics in economically and effective way.

Graphene, which is base of all graphitic structures, offers an attractive substitute for all other kinds of carbon materials. Graphene is distinctly different from CNTs and fullerenes. Graphene and chemically modified graphene sheets possess a high electrical conductivity, high surface area, and outstanding mechanical properties comparable with or even better than CNTs. The specific surface area of a single graphene sheet is 2630 $m^2/g$, which is much larger than those of activated carbon and CNTs that are usually used in the electrochemical double layer capacitors. These characteristics make graphene a most promising material for energy storage related applications.

U.S. Pat. No. 8,691,441 proposes graphene-enhanced cathode materials for lithium batteries and the graphene-enhanced cathode materials are composite materials to increase the conductivity of cathode materials. WO2012/048194 discloses nanocomposite anode materials with chemically reduced graphene. CN103682368 discloses porous structure of a three-dimensional graphene network as a conductive agent, which is deposited with cathode materials to build a flexible and fast chargeable lithium ion battery.

CITATION LIST

Patent Literature

[PTL 1] U.S. Pat. No. 8,691,441
[PTL 2] WO2012/048194
[PTL 3] CN103682368

SUMMARY OF INVENTION

Technical Problem

However, there are also issues with current graphene based materials. Firstly, the graphene may cause aggregation after reduced from graphene oxide, which cannot distribute uniformly in the battery electrodes. Secondly, the chemically reduced graphene usually have much lower conductivity (<100 S/m) than other kind of nano materials such as carbon nanotubes (>100 S/m). Thirdly, the large size of graphene sheet may block the transfer of lithium ions. Finally, the graphene made from graphene oxide could not be fabricated in low cost. In summary, there is no conductive additive that can be used for lithium ion battery with fast chargeable capability, long cycle life and low cost.

Solution to Problem

In order to solve these problems, a new material is proposed with sponge like graphene structure and pores on the surface, as an additive to improve the rate capability cycle life and capacity of the lithium ion batteries.

That is, one aspect of the present invention provides a porous graphene material with 1 to 200 graphene layers, wherein: at least one monolayer graphene is included; pores with the size of 70 nm to 200 nm are scattered over the surface of the material and the number of pores is 10 to 500 per $\mu m^2$; an oxygen concentration is below 0.8 atomic %; and the ratio of the peak height ($I_D$) of D band in a Raman scattering spectrum of the material to that of the peak height ($I_G$) of G band at 1,570 to 1,596 $cm^{-1}$ in the spectrum ($I_D/I_G$) is between 1 and 1.35.

Another aspect of the present invention provides a lithium ion battery comprising positive and negative electrodes, wherein at least one of the positive and negative electrodes includes the porous graphene material.

Still another aspect of the present invention provides a process for fabricating the porous graphene material, which the process includes: applying a thermal shock to a raw carbon material including multi-layered graphene structure in air by heating up to 250° C. with a temperature rising rate of 10° C./min or more to obtain sponge-like graphene materials, and heat treating the sponge-like graphene materials at 350° C. or higher in a reducing atmosphere.

Advantageous Effects of Invention

The porous graphene material is suitable for a conductive additive of the electrode in the lithium ion battery and the material can have higher electrolyte absorption property, which can absorb enough electrolyte even in high current, which attribute to better rate capability.

BRIEF DESCRIPTION OF DRAWINGS

FIGS. 1(A) and 1(B) show TEM images of graphene in Reference Example 1.

FIGS. 2(A) and 2(B) show TEM images of graphene in Example 1.

FIG. 3 shows an XPS analysis of graphenes in Reference Example 1 and Example 1.

FIGS. 4(A), 4(B) and 4(C) show AFM image of graphene in Reference Example 1.

FIGS. 5(A), 5(B) and 5(C) show AFM image of graphene in Example 1.

FIG. 6 shows results of Raman spectroscopy to graphenes in Reference Example 1 and Example 1.

FIG. 7 shows isotherm curves in Reference Example 1 and Example 1.

FIG. 8 shows a relation of isotherm curves and pore distribution in Reference Example 1 and Example 1.

FIG. 9 is FT-IR spectroscopy of graphenes in Reference Example 1 and Example 1.

FIG. 10 is charge and discharge curves in Example 2.

FIG. 11 is results of EIS analysis in Comparative Example 2 and Example 2.

FIG. 12 shows charging rate capability of full cells in Comparative Example 2 and Example 2.

FIG. 13 shows charge and discharge curves for high capacity oxygen-containing carbon anode materials in Comparative Example 3 and Example 3.

DESCRIPTION OF EMBODIMENTS

An exemplary embodiment of the present invention relates to a porous graphene material. The graphene material can be single layer graphene or multi-layer graphene. The number of layers of the graphene is from 1 to 200 layers. The few-stacked graphene with more than 200 layers will have much inconspicuous effect. The graphene material includes at least one monolayer graphene.

The graphene material is activated with pores; the size of the pore is controlled between 70 to 200 nm. Too small pores (<70 nm) will greatly increase the surface area and therefore, it can only provide low coulombic efficiency and poor cycle life to the objective cell (lithium ion battery). Too large pores (>200 nm) will be less effective.

The number of pores is in a range from 10 to 500 pores per $\mu m^2$. The pores are effective for the transportation of lithium ions while charging and discharging. This is because graphene is 2D sheet like materials. If there are no pores on the surface of graphene, the lithium ions cannot intercalate into the active material which coved by graphene with no pore. The pores on the graphene surface can facilitate the lithium ion intercalation into the active material. However, if there are lots of pores on the graphene surface, for example >500 pores/m$^2$, it will have negative effect on the initial charge and discharge. So the range of pore density 10 to 500 pores per $\mu m^2$ is preferred for this invention.

The graphene materials need to have a low concentration of oxygen for using a conductive additive; the concentration of oxygen is below 0.8 atomic %, preferably 0.4 atomic % or less. High concentration of oxygen may cause a low coulombic efficiency and poor cycleability in the cell.

The graphene materials have a relatively low crystallinity for a high electrolyte absorption property and easy to disperse well in slurry for electrodes. Generally, the conductivity of carbon material depends on the crystallinity, i.e., for graphite, the higher crystallinity, the higher conductivity. However, in the present embodiment, the graphene materials having a relatively low crystallinity are used in view of balancing on conductivity with the electrolyte absorption property and the dispersibity. The degree of the crystallinity of the graphene material can be determined by Raman scattering spectrum. The ratio of the peak height ($I_D$) of D band in a Raman scattering spectrum of the material to that of the peak height ($I_G$) of G band at 1,570 to 1,596 cm$^{-1}$ in the spectrum ($I_D/I_G$) is between 1 and 1.35.

The pore volume of the material is important to the absorption of electrolyte; the pore volume of the material is preferably in a range of 1.35 to 3 cm$^3$/g. The graphene conductive materials have a sponge like structure and low density; the density is preferably less than 0.3 g/cc.

The graphene materials can be further doped by boron or nitrogen with 0.1 wt % to 5 wt % for better conductivity, electrolyte absorption property and better dispersibility.

Fabrication Process:

Graphenes can be prepared by exfoliating from raw carbon materials including multi-layered graphene structure. The raw carbon materials can be selected from particles of high oxygen-containing carbon materials, such as graphite oxide, air oxidized graphite, green cokes, and any other high oxygen-containing carbon materials or a combination thereof. In these high oxygen-containing carbon materials, oxygen atoms are included as oxygen-containing functional groups such as carboxylic residue, carbonyl group, hydroxyl group or so. The exfoliated graphene includes graphene oxide. Therefore, graphene oxide can be used for the raw carbon material. The raw carbon materials can also be selected from particles of low-oxygen-containing carbon materials, such as, expandable graphite, graphite intercalation compound.

The raw carbon materials are subjected to thermal shock treatment in air by heating up to 250-400° C. with a temperature rising rate of 10° C./min or more to obtain sponge-like graphene materials.

The sponge-like graphene materials after thermal shock treatment can be further heat treated in an oxidizing atmosphere such as air at a temperature range from 350° C. to 850° C. before next step to modify the surface with the oxygen-containing functional groups.

In the next step, the mild oxidized sponge graphene will be heat treated in reducing atmosphere such as N$_2$ atmosphere to decrease oxygen concentration below 0.8 atomic %, preferably to 0.4 atomic % or less and make holes on the surface of graphene. The heat treatment is preferably carried out for 2 to 24 hours.

Lithium Ion Battery

A lithium ion battery of one exemplary embodiment of the present invention includes positive and negative electrodes, and at least one of the positive and negative electrodes includes the porous graphene material of the above exemplary embodiment, preferably as a conductive additive. Preferably, the porous graphene material is added to the negative electrode with an anode active material.

As for the anode active material, but there is also no particular restriction on the type or nature thereof, known anode materials which are capable of absorbing and desorbing lithium ions can be used for practicing the present invention. Examples of the anode active materials include: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements, wherein the alloys or intermetallic compounds are stoichiometric or nonstoichiometric; (c) oxides, carbides, nitrides, sulfides, phosphides, selenides, and tellurides of Si, Ge, Sn, Pb, Sb, Bi, Zn, Al, Fe, Ti, Ni, Co, or Cd, and their mixtures or composites; (d) carbonous materials such as natural graphite, artificial graphite, soft carbons, hard carbons and (e) combinations thereof. There is essentially no constraint on the type and nature of the anode active particles that can be used in practicing the present invention. Among them, metal or semi-metal particles or compound particles of at least one element selected from a group consisting of Si, Sn, Al, Ge and Pb are preferable. Further, carbonous particles are also preferable as the anode active materials. In particular, high oxygen-containing carbons such as graphite oxide are preferable for high capacity.

As for the positive electrode active material, but there is also no particular restriction on the type or nature thereof, known cathode materials can be used for practicing the present invention. The cathode materials may be at least one material selected from the group consisting of lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphates, metal sulfides, and combinations thereof. The positive electrode active material may also be at least one compound selected from chalcogen compounds, such as titanium disulfate or molybdenum disulfate. More preferred are lithium cobalt oxide (e.g., $Li_xCoO_2$ where $0.8 \leq z \leq 1$), lithium nickel oxide (e.g., $LiNiO_2$) and lithium manganese oxide (e.g., $LiMn_2O_4$ and $LiMnO_2$) because these oxides provide a high cell voltage. Lithium iron phosphate is also preferred due to its safety feature and low cost. All these cathode materials can be prepared in the form of a fine powder, nano-wire, nano-rod, nano-fiber, or nano-tube.

For the preparation of an electrode, a binder can be used. Examples of the binder include polytetrafluoroethylene (PTFE), polyvinylidene fluoride (PVDF), ethylene propylenediene copolymer (EPDM), or styrene-butadiene rubber (SBR).

The positive and negative electrodes can be formed on a current collector such as copper foil for the negative electrode and aluminum or nickel foil for the positive electrode. However, there is no particularly significant restriction on the type of the current collector, provided that the collector can smoothly path current and have relatively high corrosion resistance.

The porous graphene material of the above embodiment can be added when preparing slurry for anode or cathode electrode as a conductive additive. Other known conductive additives such as acetylene black, carbon black, and ultra-fine graphite particles may be co-used in such a range as not to deteriorate the effect of the porous graphene material. In addition, the porous graphene material can mix with electrode active materials to coat the active materials before the slurry preparation.

The positive and negative electrodes can be stacked with interposing a separator therebetween. The separator can be selected from a synthetic resin nonwoven fabric, porous polyethylene film, porous polypropylene film, or porous PTFE film.

A wide range of electrolytes can be used for manufacturing the cell. Most preferred are non-aqueous and polymer gel electrolytes although other types can be used. The non-aqueous electrolyte to be employed herein may be produced by dissolving an electrolyte (salt) in a non-aqueous solvent. Any known non-aqueous solvent which has been employed as a solvent for a lithium ion battery can be employed. A mixed solvent comprising ethylene carbonate (EC) and at least one kind of non-aqueous solvent whose melting point is lower than that of ethylene carbonate and whose donor number is 18 or less (hereinafter referred to as a second solvent) may be preferably employed as the non-aqueous solvent. This non-aqueous solvent is advantageous in that it is (a) stable against a negative electrode containing a carbonaceous material well developed in graphite structure; (b) effective in suppressing the reductive or oxidative decomposition of electrolyte; and (c) high in conductivity. A non-aqueous solvent solely composed of ethylene carbonate (EC) is advantageous in that it is relatively stable against decomposition through a reduction by a graphitized carbonaceous material. However, the melting point of EC is relatively high, 39-40° C., and the viscosity thereof is relatively high, so that the conductivity thereof is low, thus making EC alone unsuited for use as a secondary battery electrolyte to be operated at room temperature or lower. The second solvent to be used in the mixed solvent with EC functions to make the viscosity of the mixed solvent lowering than that of which EC is used alone, thereby improving an ion conductivity of the mixed solvent. Furthermore, when the second solvent having a donor number of 18 or less (the donor number of ethylene carbonate is 16.4) is employed, the aforementioned ethylene carbonate can be easily and selectively solvated with lithium ion, so that the reduction reaction of the second solvent with the carbonaceous material well developed in graphitization is assumed to be suppressed. Further, when the donor number of the second solvent is controlled to not more than 18, the oxidative decomposition potential to the lithium electrode can be easily increased to 4 V or more, so that it is possible to manufacture a lithium secondary battery of high voltage. Preferable second solvents are dimethyl carbonate (DMC), methyl ethyl carbonate (MEC), diethyl carbonate (DEC), ethyl propionate, methyl propionate, propylene carbonate (PC), γ-butyrolactone (γ-BL), acetonitrile (AN), ethyl acetate (EA), propyl formate (PF), methyl formate (MF), toluene, xylene and methyl acetate (MA). These second solvents may be employed singly or in a combination of two or more. More desirably, this second solvent should be selected from those having a donor number of 16.5 or less. The viscosity of this second solvent should preferably be 28 cps or less at 25° C. The mixing ratio of the aforementioned ethylene carbonate in the mixed solvent should preferably be 10 to 80% by volume. If the mixing ratio of the ethylene carbonate falls outside this range, the conductivity of the solvent may be lowered or the solvent tends to be more easily decomposed, thereby deteriorating the charge/discharge efficiency. More preferable mixing ratio of the ethylene carbonate is 20 to 75% by volume. When the mixing ratio of ethylene carbonate in a non-aqueous solvent is increased to 20% by volume or more, the solvating effect of ethylene carbonate to lithium ions will be facilitated and the solvent decomposition-inhibiting effect thereof can be improved.

EXAMPLES

Comparative Example 1

Carbon black with the particle size of 40 nm was used for Comparative Example 1.

Reference Example 1

10 g of Graphite oxide is used as the raw materials. The graphite oxide was thermal shocked in air from room temperature to 250° C. with a temperature rising rate of 10° C./min to obtain a sponge like graphene structure. This material was used as Reference Example 1. TEM (Transmission Electron Microscope) images of the sample are shown in FIGS. 1(A) and 1(B). Monolayer graphenes are acknowledged. FIGS. 4(A) to 4(C) show AFM (Atomic Force Microscope) images of this sample.

Example 1

10 g of Graphite oxide is used as the raw materials. The graphite oxide was thermal shocked in air from room temperature to 250° C. with a temperature rising rate of 10° C./min to obtain a sponge like graphene structure. After that, the material was heat treated in $N_2$ atmosphere for 12 h at 1000° C. to obtain a material used as Example 1. TEM images of the sample are shown in FIGS. 2(A) and 2(B). Monolayer graphenes are acknowledged. FIGS. 5(A) to 5(C) show AFM images of this sample.

Materials of Reference Example 1 and Example 1 were evaluated by a Temperature Programed Desorption Mass Spectrometry (TPD-MS). Results are shown in Table 1.

TABLE 1

Gas evolution [He atmosphere, room temperature ~1000° C.]

| Mass number | | Gas (wt %)$^c$ | |
|---|---|---|---|
| m/z | | Ref. Exam. 1 | Example 1 |
| 18 | $H_2O$ | 0.66 | 0.24 |
| 28 | CO and etc | 23 | n.d. |
| 44 | $CO_2$ and etc | 5.3 | 0.11 |

FIG. 3 shows XPS (X-ray photoelectron spectroscopy) analysis of Reference Example 1 and Example 1. Example 1 almost has no oxygen-containing functional group. Results of XPS elemental composition analysis and XPS C1s peak analysis are summarized in Tables 2 and 3, respectively.

TABLE 2

| | Elemental composition (atomic %) | |
|---|---|---|
| | C | O |
| Comp. Exam. 1 | 99.7 | 0.3 |
| Ref. Exam. 1 | 87.1 | 12.9 |
| Example 1 | 99.6 | 0.4 |

TABLE 3

| | C1s peak analysis (%) | | | |
|---|---|---|---|---|
| | COO | C=O | C—O | C—C, C=C, CH$x$ |
| Comp. Exam. 1 | — | — | — | 100 |
| Ref. Exam. 1 | 2 | 3 | 8 | 86 |
| Example 1 | — | — | — | 100 |

The material of Example 1 is similar to carbon black of Comparative Example 1 which is no oxygen-containing functional group. Therefore, the material of Example 1 would have better conductivity.

Table 4 shows results of elemental analysis by vario MICRO cube and varioEL-III.

TABLE 4

Elemental analysis results

| | Element weight percentage (wt %) | | | |
|---|---|---|---|---|
| | C | O | N | H |
| Comp. Exam. 1 | 99.9 | — | — | — |
| Ref. Exam. 1 | 76.3 | 20.1 | <0.3 | 0.7 |
| Example 1 | 99.5 | 0.5 | <0.3 | — |

FIG. 6 shows Raman spectroscopy of the materials in Reference Example 1 and Example 2. Both of them showed a relatively low crystallinity and full with defects. However, compare to Reference Example 1, peak $v(v_G)$ which is also called as Graphitization degree, highly crystalized graphite have a $v_G$ near 1580 cm$^{-1}$, while amorphous carbon have a $v_G$ near 1600 cm$^{-1}$. In this case, $v_G$ in Example 1 is shifted to lower frequency, which means a better crystallinity. Moreover, the material of Example 1 has a higher intensity of D band, which means it has more edges or pore defects. Data summary of Raman analysis is shown in Table 5.

TABLE 5

| | | Intensity | | |
|---|---|---|---|---|
| | vG (cm$^{-1}$) | $I_G$ | $I_D$ | $I_D/I_G$ |
| Ref. Exam. 1 | 1598.8 | 127.9 | 109.2 | 0.85 |
| Example 1 | 1595.8 | 17.1 | 21.9 | 1.28 |

FIG. 7 shows isotherm curves of the materials in Reference Example 1 and Example 1. Example 1 has higher specific surface area than Reference Example 1. Both of them showed a type IV isotherm curves.

FIG. 8 shows isothermal curves and pore distribution of the materials in Reference Example 1 and Example 1. Table 6 is summary of the results in measurements of pore volume, pore surface area, peak diameter, average diameter and BET surface area of materials in Comparative Example 1, Reference Example 1 and Example 1.

TABLE 6

| | Pore volume $V_p$ (cm$^3$/g) | Pore surface area $S_p$ (m$^2$/g) | Peak diameter $d_p$ (nm) | Average diameter $d_{av}$ (nm) | BET surface area (m$^2$/g) |
|---|---|---|---|---|---|
| Comp. Exam. 1 | 0.4 | 874 | 2 | 3.8 | 1316 |
| Ref. Exam. 1 | 1.3 | 407 | 108.6 | 12.8 | 505 |
| Example 1 | 1.8 | 696 | 79.8 | 10.3 | 746 |

FIG. 9 shows FT-IR spectroscopy of materials in Reference Example 1 and Example 1. It can be seen that the material in Example 1 has much less oxygen containing peaks than the material in Reference Example 1. It can be concluded that the material in Example 1 has better conductivity.

Comparative Example 2

A granulated natural graphite material with diameter of 20 μm is used as an anode active material; lithium iron phosphate (LFP) is used as a cathode active material. The composition of the anode is graphite: CMC (carboxymethyl cellulose):SBR (Styrene-Butadiene Rubber):carbon black as 91:4:2:3 in terms of weight ratio, respectively. The composition of the cathode is LFP:PVDF:carbon black as 89:7:4 in terms of weight ratio, respectively. The anode composition (slurry) was coated on a Cu foil current collector, dried at 120° C. for 15 min, pressed to 45 µm thick with a basis weight of 80 g/m² per single side and cut into 23-25 mm to prepare a negative electrode. The cathode composition (slurry) was coated on an Al foil current collector, dried at 120° C. for 15 min, pressed to 85 µm thick with a basis weight of 145 g/m² per single side and cut into 22-24 mm to prepare a positive electrode. The negative and positive electrodes were stacked by interposing porous polypropylene film there between as a separator. The resultant stack and an electrolyte prepared by dissolving 1M $LiPF_6$ in a mixed solvent of ethylene carbonate (EC) and diethyl carbonate (DEC) in a volume ratio of 3:7 were sealed into an aluminum laminate container to fabricate a test cell.

Example 2

A granulated natural graphite material with diameter of 20 µm is used as anode; lithium iron phosphate (LFP) is used as cathode. The composition of the anode material is graphite:CMC:SBR:carbon black:material made in Example 1 as 90.5:4:2:3:0.5 in terms of weight ratio, respectively. The composition of the cathode material is LFP:PVDF:carbon black as 89:7:4 in terms of weight ratio, respectively. Test cell and full cell were fabricated in a similar manner as in Comparative Example 2.

FIG. 10 shows charge and discharge curves of Example 2.

FIG. 11 shows results of EIS (Electrochemical Impedance Spectroscopy) analysis of cells in Comparative Example 2 and Example 2. Generally, the function of the conductive additive is to increase the conductivity of the electrode materials. Although the proposed new additive (Example 2) does not improve the resistance of the electrode compared with carbon black (Comparative Example 2) as can be seen from the enlarged graph of this figure, this new materials can have higher electrolyte absorption property, which can absorb enough electrolyte even in high current, which attribute to better rate capability.

FIG. 12 shows charging rate capability in full cells of Comparative Example 2 and Example 2. The cut potential is between 2.3V-4.3V. The cells are charged in 0.1 C, 0.2 C, 0.5 C, 1 C, 2 C, 3 C, 4 C, 6 C, 8 C, 10 C, and discharged in 0.1 C. The cell of Example 2 showed higher capacity retention in each rate, especially high rate, such as 6 C, 8 C, 10 C. This rate performance showed the proposed new conductive additives can increase the rate performance of carbon anode materials.

Comparative Example 3

A flake like high oxygen containing graphite (6.3% of oxygen containing) with diameter of 15 µm is used as anode; lithium iron phosphate (LFP) is used as cathode. The composition of the anode material is graphite:CMC (carboxymethyl cellulose):SBR (Styrene-Butadiene Rubber):carbon black as 91:4:2:3 in terms of weight ratio, respectively. The composition of the cathode material is LFP:PVDF:carbon black as 89:7:4 in terms of weight ratio, respectively. Full cell was fabricated in a similar manner as in Comparative Example 2.

Example 3

A flake like high oxygen-containing graphite (6.3% of oxygen containing) with diameter of 15 µm is used as anode; lithium iron phosphate (LFP) is used as cathode. The composition of the anode material is graphite:CMC (carboxymethyl cellulose):SBR (Styrene-Butadiene Rubber):material made in Example 1 as 91:4:2:3 in terms of weight ratio, respectively. The composition of the cathode material is LFP:PVDF:carbon black as 89:7:4 in terms of weight ratio, respectively. Full cell was fabricated in a similar manner as in Comparative Example 2.

FIG. 13 shows charge and discharge curves for full cells in Comparative Example 3 and Example 3 which are using the high oxygen-containing graphite as the anode material. The adding of the new materials can greatly increase the capacity of the anode. Data are summarized in Table 7.

TABLE 7

| | Capacity (mAh/g) | Coulombic efficiency (%) | Rate Capability (%) | | |
|---|---|---|---|---|---|
| | | | 1C/0.1C | 6C/0.1C | 10C/0.1C |
| Comparative Example 3 | 144 | 40 | 98 | 56 | 32 |
| Example 3 | 417 | 47 | 98 | 72 | 43 |

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The invention claimed is:

1. A porous graphene material comprising at least one monolayer graphene and multi-layered graphenes having 200 layers or less
   wherein:
      pores with the size of 70 nm to 200 nm are scattered over the surface of the material and the number of pores is 10 to 500 per $\mu m^2$;
      an oxygen concentration of the material is below 0.8 atomic%; and
      the ratio of the peak height ($I_D$) of D band in a Raman scattering spectrum of the material to that of the peak height ($I_G$) of G band at 1,570 to 1,596 cm$^{-1}$ in the spectrum ($I_D/I_G$) is between 1 and 1.35.

2. The porous graphene material according to claim 1, wherein the pore volume of the material is in a range of 1.35 to 3 cm³/g.

3. The porous graphene material according to claim 1, wherein the density of the material is less than 0.3 g/cc.

4. A lithium ion battery comprising positive and negative electrodes, wherein at least one of the positive and negative electrodes comprises the porous graphene material according to claim 1.

5. The lithium ion battery according to claim 4, wherein the porous graphene material is a conductive additive.

6. The lithium ion battery according to claim 5, wherein the porous graphene material is added to the negative electrode with a carbon anode active material.

7. The lithium ion battery according to claim 6, wherein the carbon anode active material is an oxygen-containing graphite.

8. A process for fabricating the porous graphene material according to claim 1, the process comprising:
   applying a thermal shock to a raw carbon material including multi-layered graphene structure in air by heating up to 250-400° C. with a temperature rising rate of 10° C/min or more to obtain sponge-like graphene materials, and heat treating the sponge-like graphene materials at 350° C or higher in a reducing atmosphere.

9. The process according to claim 8, wherein the raw carbon material is selected from particles of high oxygen-containing carbon materials.

10. The process according to claim 8, wherein the process further comprises oxidizing the sponge-like graphene materials in an oxidizing atmosphere at a temperature range from 350° C. to 850° C. before the heat treating in the reducing atmosphere.

11. A lithium ion battery comprising positive and negative electrodes, wherein at least one of the positive and negative electrodes comprises the porous graphene material according to claim 2.

12. The lithium ion battery according to claim 11, wherein the porous graphene material is a conductive additive.

13. The lithium ion battery according to claim 12, wherein the porous graphene material is added to the negative electrode with a carbon anode active material.

14. The lithium ion battery according to claim 13, wherein the carbon anode active material is an oxygen-containing graphite.

15. A lithium ion battery comprising positive and negative electrodes, wherein at least one of the positive and negative electrodes comprises the porous graphene material according to claim 3.

16. The lithium ion battery according to claim 15, wherein the porous graphene material is a conductive additive.

17. The lithium ion battery according to claim 16, wherein the porous graphene material is added to the negative electrode with a carbon anode active material.

18. The lithium ion battery according to claim 17, wherein the carbon anode active material is an oxygen-containing graphite.

* * * * *

UNITED STATES PATENT AND TRADEMARK OFFICE
CERTIFICATE OF CORRECTION

PATENT NO. : 10,665,863 B2
APPLICATION NO. : 15/753781
DATED : May 26, 2020
INVENTOR(S) : Qian Cheng and Noriyuki Tamura It is certified that error appears in the above-identified patent and that said Letters Patent is hereby corrected as shown below:

In the Specification

Column 3, Description of Embodiments, Line 50; Delete "pores/m$^2$," and insert --pores/µm$^2$,-- therefor Column 5, Description of Embodiments, Line 23; Delete "0.8≤z≤1)," and insert --$0.8 \leq x \leq 1$),-- therefor In the Claims Column 10, Line 36; In Claim 1, after "less", insert --,--

Signed and Sealed this
Seventeenth Day of November, 2020

Andrei Iancu
*Director of the United States Patent and Trademark Office*